United States Patent
Kowalik et al.

(10) Patent No.: US 7,620,498 B2
(45) Date of Patent: Nov. 17, 2009

(54) AUTOMATED BOREHOLE IMAGE INTERPRETATION

(75) Inventors: William Stephen Kowalik, San Ramon, CA (US); William Charles Corea, San Ramon, CA (US); William Harrison Crane, Houston, TX (US); William John Schweller, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 243 days.

(21) Appl. No.: 11/844,193

(22) Filed: Aug. 23, 2007

(65) Prior Publication Data
US 2009/0055097 A1    Feb. 26, 2009

(51) Int. Cl.
*G06F 19/00* (2006.01)
(52) U.S. Cl. .......................................... 702/8; 324/323
(58) Field of Classification Search .................. 702/6, 702/8, 14, 188, 182–185; 324/323
See application file for complete search history.

(56) References Cited

U.S. PATENT DOCUMENTS

| | | | |
|---|---|---|---|
| 5,148,110 A * | 9/1992 | Helms | 324/323 |
| 6,363,327 B1 | 3/2002 | Wallet et al. | |
| 6,832,002 B2 | 12/2004 | Baatz et al. | |
| 7,117,131 B2 | 10/2006 | Binnig | |
| 7,146,380 B2 | 12/2006 | Schaepe et al. | |

2007/0036440 A1    2/2007    Schaepe et al.

OTHER PUBLICATIONS

Ye at al., Automatic High Resolution Sedimentary Dip Detection on Borehole Imagery, SPWLA 38$^{th}$ Annual Logging Symposium, Jun. 15-18, 1997, pp. 1-13.
Ye et al., Automatic High Resolution Texture Analysis on Borehole Imagery, SPWLA 39$^{th}$ Annual Logging Symposium, May 26-29, 1996, pp. 1-14.
Ye et al., A New Tool for Electro-Facies Analysis: Multi-Resolution Graph-Based Clustering. SPWLA 41$^{st}$ Annual Logging Symposium, Jun. 4-7, 2000, pp. 1-14.
Cheung et al, Field Test Results of a New Oil-Base Mud Formation Imager Tool, SPWLA 42$^{nd}$ Annual Logging Symposium. Jun. 17-20, 2001, pp. 1-14.
Basu et al., Enhanced Reservoir Characterization in a Deep Water Turbidite System Using Borehole Images and Spectroscopy Logs, SPWLA 48$^{th}$ Annual Logging Symposium, Jun. 3-6, 2007, pp. 1-13.
Borehole Imaging Integrated with Borehole Spectroscopy Delivers Better Sittratigraphic Interpretation, Schlumberger Marketing Communications, Mar. 2006.

* cited by examiner

*Primary Examiner*—Edward Raymond
(74) *Attorney, Agent, or Firm*—Torrey A. Pennebaker; Maurice Teixeira

(57) ABSTRACT

A method of analyzing characteristics of a subterranean formation includes transmitting a signal at least partially into a material of the subterranean formation such that the signal is transformed in a manner indicative of a characteristic of the material, receiving the transformed signal from the material, converting the transformed signal into image data indicative of the characteristic of the material, applying a first set of machine executable rules to the image data to produce segmented image data, wherein portions of the image that are sufficiently related according to the applied rules are grouped into segments, and analyzing, according to a second set of machine executable rules, the segmented image data to produce a geological profile of the subterranean formation.

27 Claims, 5 Drawing Sheets

AUTOMATED BOREHOLE IMAGE INTERPRETATION

BACKGROUND OF THE INVENTION

1. Field of the Invention

The present invention relates generally to characterization of geologic data and more particularly to automated interpretation of borehole log data.

2. Description of the Related Art

Borehole data is collected via a number of techniques including resistivity/conductivity measurements, ultrasound, NMR, and radiation scattering, for example. Conventionally, borehole data is analyzed by human interpreters in order to characterize a subsurface geological formation to allow decisions to be made regarding the potential of a well or to determine information about the nature of the surrounding geologic area. Borehole data of this type may be used to replace or supplement the collection of cores for direct inspection.

SUMMARY OF THE INVENTION

Aspects of embodiments of the present invention provide a method of analyzing characteristics of a subterranean formation including transmitting a signal at least partially into a material of the subterranean formation such that the signal is transformed in a manner indicative of a characteristic of the material, receiving the transformed signal from the material, converting the transformed signal into image data indicative of the characteristic of the material, applying a first set of machine executable rules to the image data to produce segmented image data, wherein portions of the image that are sufficiently related according to the applied rules are grouped into segments, and analyzing, according to a second set of machine executable rules, the segmented image data to produce a geological profile of the subterranean formation.

An aspect of an embodiment of the present invention provides an apparatus for analyzing characteristics of a subterranean formation, including a probe, configured and arranged to transmit a signal at least partially into a material of the subterranean formation and to receive a transformed signal from the material, wherein the transformed signal is transformed in a manner indicative of a characteristic of the material, a processor, configured and arranged to convert the transformed signal into image data indicative of the characteristic of the material and to apply a first set of machine executable rules to the image data to produce segmented image data, wherein portions of the image that are sufficiently related according to the applied rules are grouped into segments and to apply a second set of machine executable rules to analyze the segmented image data to produce a geological profile of the subterranean formation.

Another aspect of an embodiment of the present invention provides an apparatus for analyzing characteristics of a subterranean formation, including a bus, configured and arranged to receive, from a probe, data representing a characteristic of a material in a borehole and a processor, configured and arranged to receive the data from the bus, and to convert the data into image data indicative of the characteristic of the material and to apply a first set of machine executable rules to the image data to produce segmented image data, wherein portions of the image that are sufficiently related according to the applied rules are grouped into segments and to apply a second set of machine executable rules to analyze the segmented image data to produce a geological profile of the subterranean formation.

Another aspect of an embodiment of the present invention provides a machine readable medium encoded with machine executable instructions for performing a method of analyzing characteristics of a subterranean formation including transmitting a signal at least partially into a material of the subterranean formation such that the signal is transformed in a manner indicative of a characteristic of the material, receiving the transformed signal from the material, converting the transformed signal into image data indicative of the characteristic of the material, applying a first set of machine executable rules to the image data to produce segmented image data, wherein portions of the image that are sufficiently related according to the applied rules are grouped into segments, and analyzing, according to a second set of machine executable rules, the segmented image data to produce a geological profile of the subterranean formation.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE EXEMPLARY EMBODIMENTS

Figure 1:
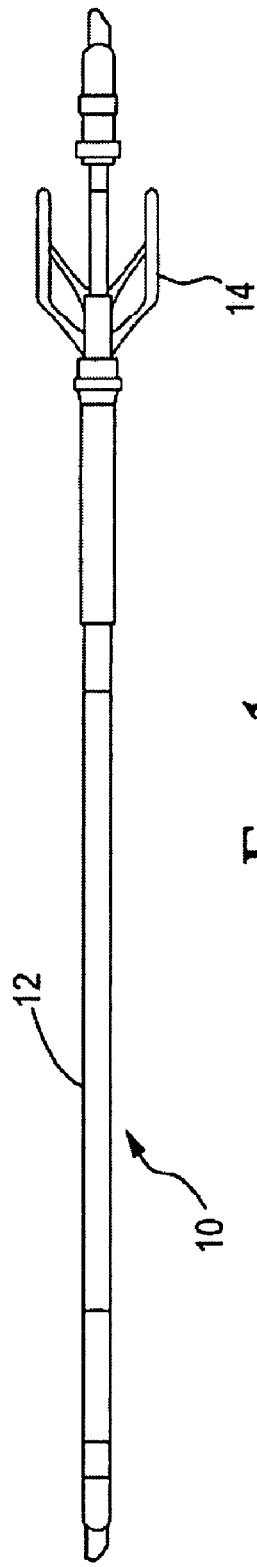
FIG. 1 illustrates an example of a borehole probe in accordance with an embodiment of the present invention.

FIG. 1 illustrates a probe 10 for use in borehole characterization that includes a generally elongated shaft 12 having at one end a number of outwardly extending members 14. The outwardly extending members 14 may each include a sensor 16 (shown in more detail in FIGS. 2a and 2b) for interrogating a region 18 of a borehole. The illustrated sensor 16 includes a plurality of pairs of sensors 20 for monitoring a change in voltage that is developed across a portion 22 of region 18 when a current is injected through the current injector electrodes 24. One example of a suitable probe 10 is a device sold under the trade name of OBMI™ from Schlumberger Technology Corp. of Houston, Tex.

Figure 2B:
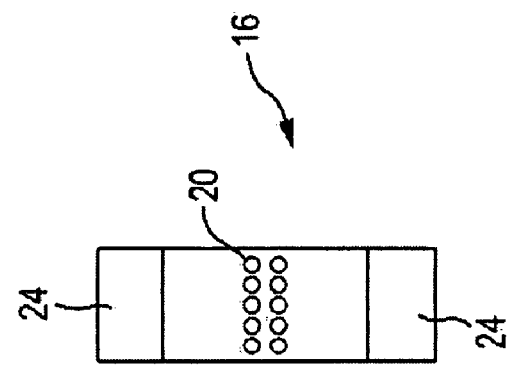
FIGS. 2a and 2b are side and front views respectively of a sensor portion of a probe as shown in FIG. 1.
Figure 2A:
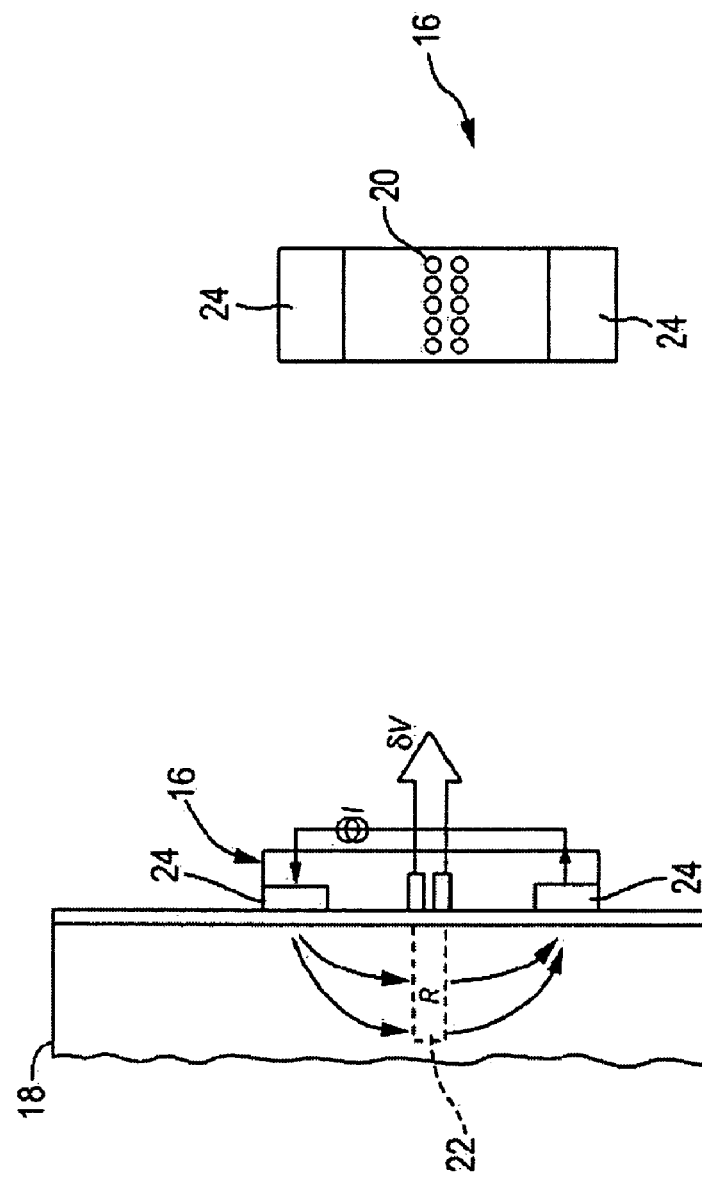

Though the sensor 16 shown in FIGS. 2a and 2b is constructed and arranged for measuring electrical characteristics of the borehole material, this is for illustrative purposes only and a wide variety of sensors may be employed in various embodiments of the present invention. In particular, it is envisioned that measurements of resistivity, ultrasound, or other sonic waves, complex electrical impedance, gamma ray reflectivity or transmissivity, neutron reflectivity or transmissivity, nuclear magnetoresonance, video imaging and/or spectrometry may be employed. Consistent with this, the sensor 16 may be selected as appropriate for the measurement to be made, including, by way of non-limiting example, electrical sources and detectors, radiation sources and detectors, and acoustic transducers. As will be appreciated, it may be useful to include multiple types of sensors on a single probe 10 and various combinations may be usefully employed in this manner.

In use, the probe 10 is generally lowered into the borehole to be characterized. Upon reaching an appropriate depth, which may be a bottom of the hole, or a selected intermediate depth, the probe is retrieved and measurements are taken as the probe rises through the material. In many cases, the probe 10 will have four sensors 16 so that the hole may be characterized in each of four directions, which may be denominated 0, 90, 180 and 270, for example.

The operation of the probe 10 will be described using the example of the electrical electrical sensors illustrated in FIGS. 2a and 2b. While resistivity measurements are described here in detail, the particulars will vary in accordance with the particular sensor employed in a given implementation. The probe 10 takes measurements by transmitting, from the electrodes 24, an electrical signal, which may be a DC or AC or otherwise varying current I, at least partially into a region 18 of material of the borehole. As will be appreciated, the penetration of the signal will depend in part on the nature of the measurement. A reflectivity measurement involves nearly no depth of penetration into the material under interrogation, while a resistivity measurement requires the signal to propagate some distance through the material. However each of the foregoing degrees of penetration should be understood to be within the scope of the present invention.

In the case of resistivity, the signal propagates through the material and is received by the sensors 20. The sensors 20 measure a change in voltage $\delta V$ across a portion 22 of the region 18 that is indicative of a characteristic (in this case, resistivity) of the material that is present in the subterranean formation being characterized. In an embodiment, the resistivity R of the material in the portion 22 may be calculated based on the formula: $R=k(\delta V/I)$, where I is the current generated by the electrodes 24 and k is a geometrical factor that may be predetermined based on a geometry of the electrodes 24 and the sensors 20. As will be appreciated, this formula depends on the material being relatively uniform within the distance between the electrodes 24. For this reason, the scaling factor k may be implemented as a dynamic scaling, which may provide additional detail.

Data collected by the probe are generally relayed via a wire, though the connection may equally usefully be made wireless, to a computer 25 that may be, for example, located at a drilling facility where the data may be received via a bus 26 of the computer 25, which may be of any suitable type, and stored, for example on a computer readable storage device 27 such as a hard disk, optical disk, flash memory, temporary RAM storage or other media for processing with a processor 28 of the computer 25.

Figure 3:
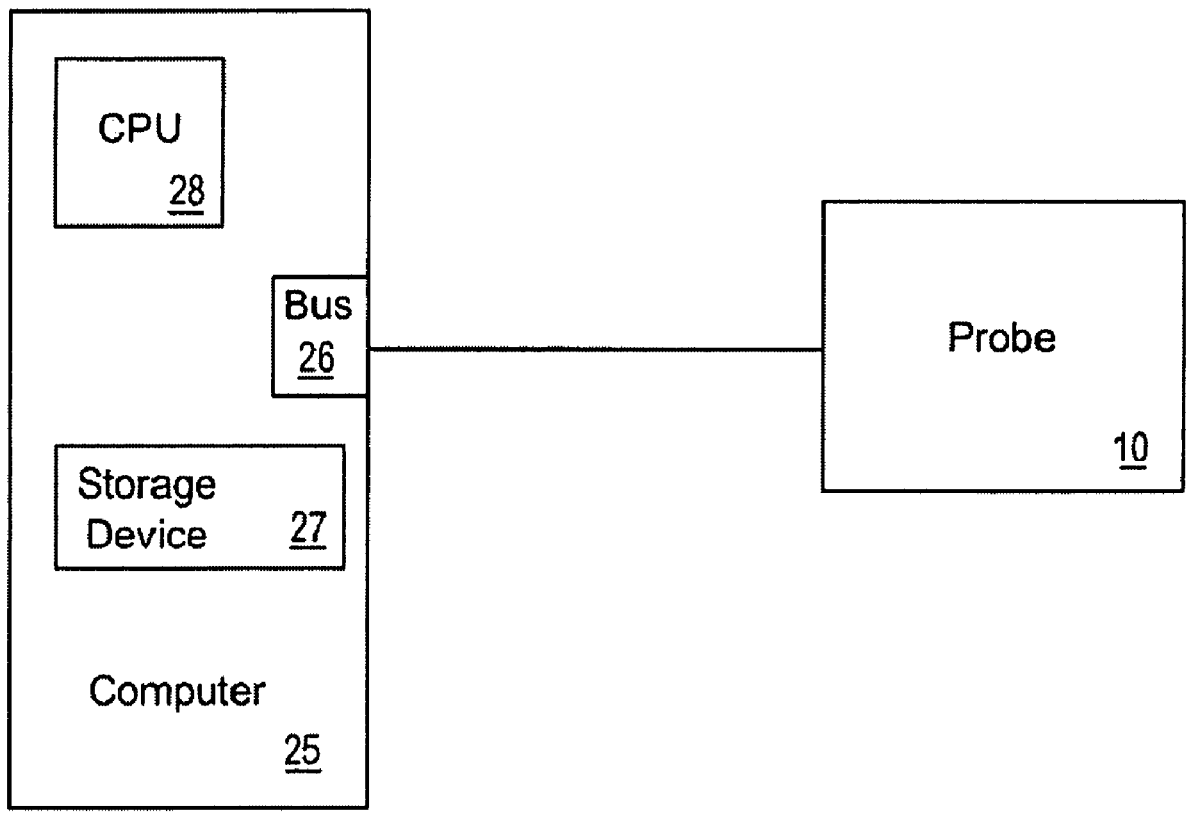
FIG. 3 is schematic illustration of a probe in communication with a computer in accordance with an embodiment of the invention.
Figure 4:
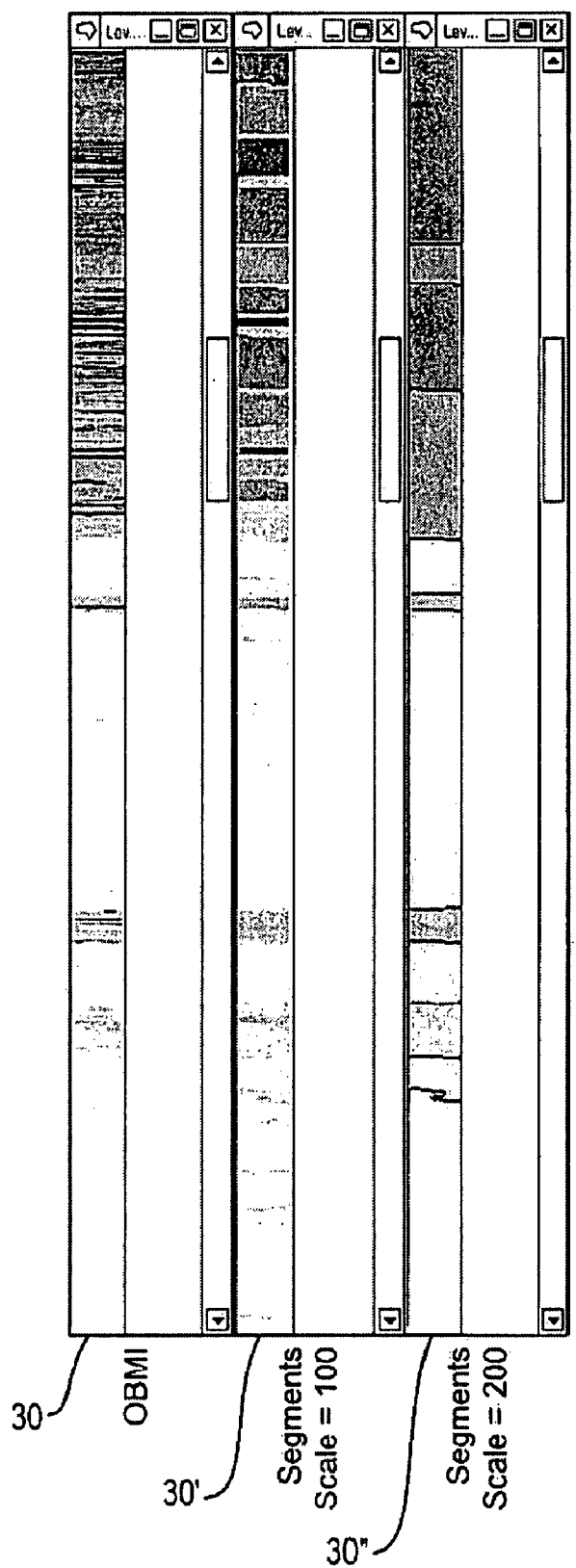
FIG. 4 is an illustration of image data and segmented image data representing resistivity measurements.

As shown in FIG. 4, the data may be converted to a graphical form, as image data 30 for display and/or further processing. The graphical data may be stored as full-color data (for example, 24-bit JPEG data) or may be single color or grey-scale data. In the examples as described below, the initial conversion is to a full-color image, and particular channels may be separated for analysis as desired. For the example shown in FIG. 3, the data are originally in color, but converted to a grey scale solely in order to present them as patent application figures. Nonetheless, the darker areas of the image data 30 represent relatively conductive regions and the lighter areas represent relatively resistive regions. The darker, more conductive regions may be interpreted as shales, while the lighter, more resistive regions may be sandy regions.

The image data 30 is segmented based on, for example, a homogeneity of local areas to produce segmented image data 30' or 30". The segmentation may be performed by analyzing the image data using software that determines image homogeneity, such as, for example, eCognition™ from Definiens AG of Munich, Del. based at least in part on color and location of picture elements. In an embodiment that makes use of eCognition™ software, a parameter referred to in that software as "scale" may be selected such that segments are of a size appropriate for the analysis to be performed. The inventors have determined that for boreholes of a depth typical to petroleum exploration, a scale of approximately 200 in the eCognition™ software system is suitable and provides segments having appropriate size for stratigraphic analysis, similar to that shown as segmented image data 30", which will be used as an example for the purposes of this disclosure, though the scope of the invention of course should not be limited to this particular implementation. This segmentation parameter corresponds approximately to segments having a scaled on the order of about 1 m, which the inventors find is useful for the type of materials and geological histories they typically encounter. In particular, segments may be between 0.05 m and 5 m and more particularly between 0.2 m and 0.8 m. As will be appreciated, the scale may be varied in accordance with the particular need for resolution in any particular case. In carrying, out the segmentation, the inventors have further determined that it is useful to use a criterion that favors segments having approximately equal areas.

The same process may be employed for characterization of density (or indeed any type) data that have been converted to an image. In particular, the inventors have determined that it may be useful to include density data as a grey-scale image that may be spatially matched to the resistivity log image.

Figure 5:
FIG. 5 is an example of a fuzzy classification function relating color to class membership.

Once the data are segmented, a second set of rules may be executed in a computer processor to further analyze the segmented image data 30". One example of such a rule is illustrated in FIG. 5, showing how a fuzzy rule may be defined that determines whether (1.0) or not (0), a particular segment is a member of a particular class based on an 8-bit color value. While in theory it may be possible to define rules that contain clear cut-offs (i.e., square wave or step-like functions), typically this will not be the case, and fuzzy classifications will produce better results. Moreover, each classification rule may itself include a plurality of fuzzy membership functions. The following Example 1 provides greater detail on one implementation of a rules-based classification approach. Note that while the described Example makes use of binary classifications, it may be useful to create ternary or other higher-ordered separation rule systems.

EXAMPLE 1

Figure 6:
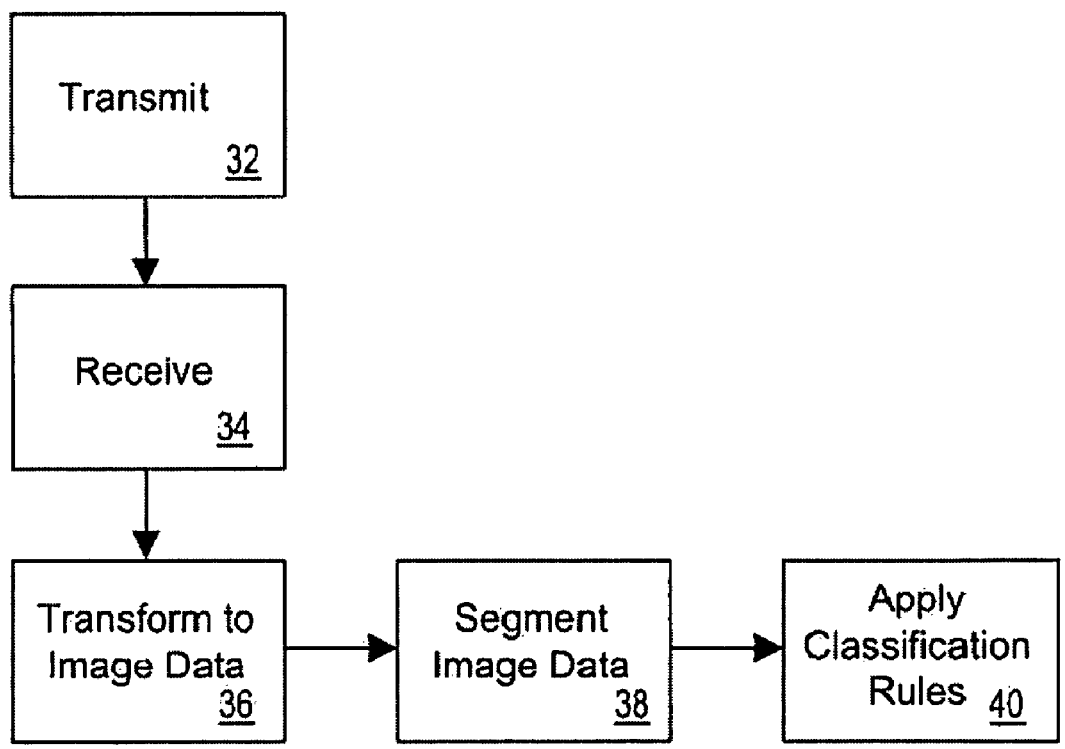
FIG. 6 is a flowchart illustrating process steps in accordance with an embodiment of the invention.
Figure 7:
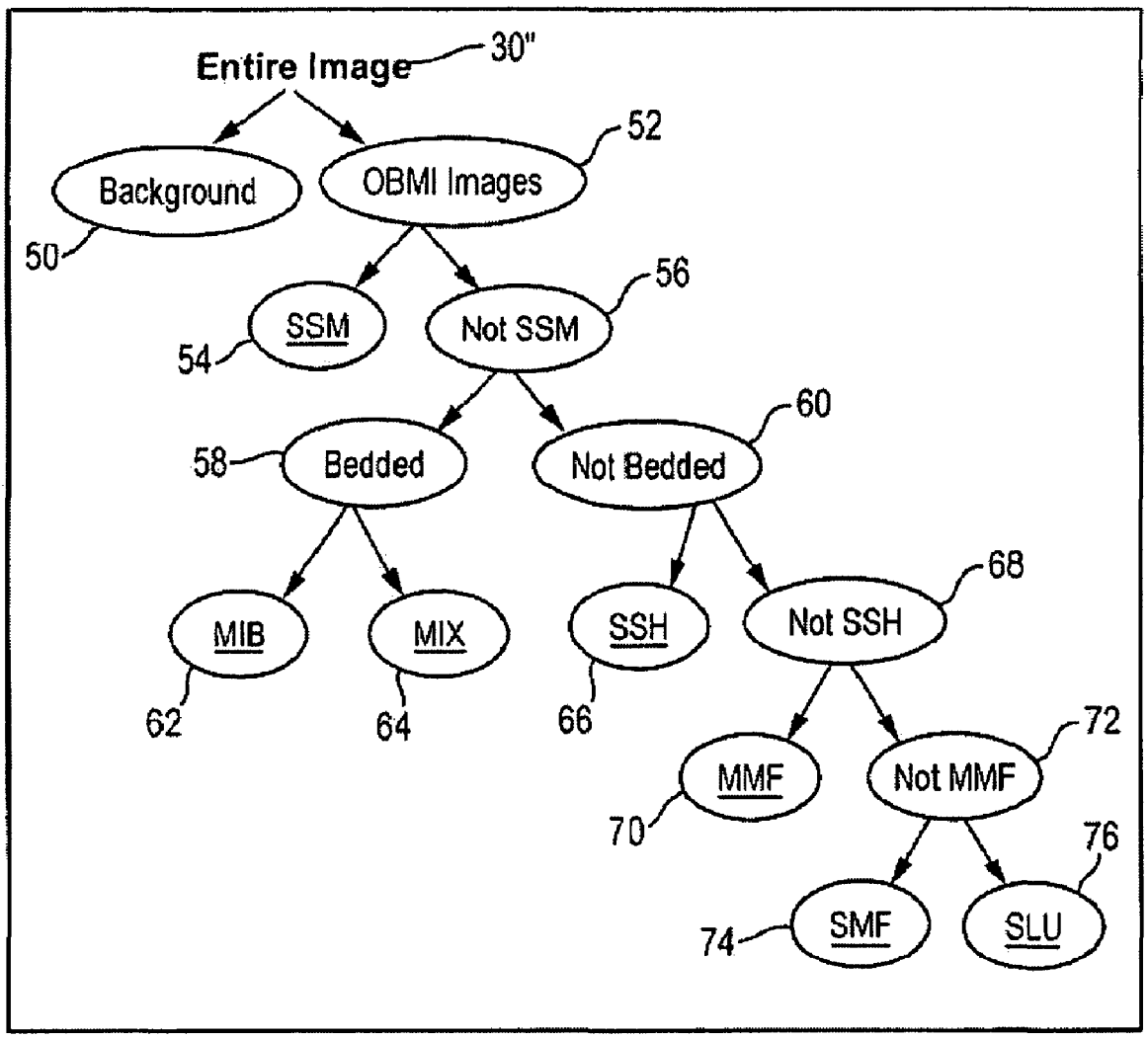
FIG. 7 is an illustration of a hierarchy of classes in accordance with an embodiment of the present invention.

FIG. 6 is a flow chart illustrating steps of a method according to an embodiment of the invention. As described above, the probe sensors 16 transmit 32 a signal into the borehole. A transformed signal is received 34 by the sensors 16 and relayed to the computer 25 for processing. The data are transformed into image data at 36, and segmented at 38 to produce segmented image data 30". A series of hierarchical classification rules is applied to the segments of the segmented image data 30", as illustrated in FIG. 7. At each step of the hierarchical classification, a binary separation is made between a selected classification and the remainder of the facies.

As may be seen from FIG. 7, the segmented image data 30" and background components 50 of the data are separated to produce segmented OBMI™ images 52. This is accomplished by defining a membership function that is a delta function, or a spike. One example of a suitable spike is a one value wide spike centered at 151 for each of three (RGB) color channels (i.e., for each color, the membership is equal to one for a color value of 151, and is equal to zero for all other values). Once the background has been removed, the remaining data comprises the OBMI™ images.

The OBMI™ images 52 are then separated into two classes, SSM (sandstone massive) 54 and not-SSM 56. As described above, sand may generally be separated as being relatively light in color, thus, in the Example, the membership functions that together define the SSM class 56 relate to the color intensity of the image segment, and appear similar to the function illustrated in FIG. 5. In particular, for each of red, green and blue, a membership function is defined that has an s-curved shape like the one in FIG. 5, increasing at a varying rate from the zero point up to 255. In the example, the center of the s-curved shape is at the midpoint of the range for red and green, but blue is restricted to the range 50-150 with a center at 100. Furthermore, the SSM/not-SSM classification function inherits the function from the previous step (i.e., the spike functions that were used to differentiate background/OBMI™ classes).

The not-SSM segments 56 are then further divided into bedded 58 and not-bedded 60 classes. Similarly to the previous step, the not-SSM classification function and the not-background function are inherited into the not-bedded function. Furthermore, the not-bedded function includes additional fuzzy classification functions that relate to texture and color intensity.

For analyzing textures in making this classification, a grey-level co-occurrence matrix (GLCM) contrast (0° direction) function and a GLCM standard deviation (0° direction) function are applied to the red component of the members of the not-SSM class. As will be appreciated, the endpoints of the GLCM functions are not 0 and 255 as with color intensity, but rather depend on the range of textures present (in the Example, 1400-1800 with a center point at 1600). Each of these is an s-curve of the type illustrated in FIG. 5 and uses the GLCM direction. In addition to the textural analysis, a similar curve for red intensity is used. In the Example, an additional GLCM homogeneity (0° direction) function having the same s-curve, but reversed in that it declines from left to right rather than rising, was kept inactive, however including the homogeneity function may be useful given a different data set.

As an aid to understanding, the GLCM contrast (0°) function assigns higher bedded membership values for image segments that have relatively higher values of contrast in a vertical direction, and as mentioned above, it is applied to the red component. Likewise, the GLCM homogeneity (0°) function assigns lower bedded membership values (due to its reversed curvature) for higher values of homogeneity in the vertical direction, also as applied to the red channel. By way of comparison, the relevant range of values for GLCM homogeneity (0°) is from 0 to 0.25 with a center at 0.125. Finally, the GLCM standard deviation (0°) function assigns higher bedded membership values for segments having higher values of standard deviation in the vertical direction for the red component. Again by way of comparison, relevant ranges of values for this function in the Example are 33-53 centered at 43.

While bedded segments may be separated from non-bedded segments using texture and color of the resistivity data, it may be difficult to separate particular types of bedded segments from one another on the basis of resistivity. That is, for the resistivity, each class has similar characteristics. In order to overcome this difficulty, the bedded segments 58 are separated into MIB (interbedded) and MIX (interlaminated) classes 62,64, based on gamma ray data, for which the two classes tend to have differing characteristics. In particular, a mean gamma log value for the segment is evaluated using a step function having a selection threshold criterion. Segments that meet the selection criterion are identified as MIX 64 and the remainder are identified as MIB 62, in the Example, the range is 145-215 and the threshold is set at 180. As above, all of the additional higher level functions of higher level classes to which MIB and MIX belong are inherited (i.e., bedded, not-SSM, OBMI™ images).

As a next step, the not-bedded segments 60 are further classified between SSH (shale and mudstone) 66 and not-SSH 68. This classification is made on the basis of two textural functions GLCM homogeneity (90°) and GLCM standard deviation (0°), both applied to the blue resistivity image. A third function, mean value of the gamma ray log, is additionally included. The first of the three is a curved ramp that assigns higher values for SSH classification for higher values of GLCM homogeneity in the horizontal direction for the blue component (ranging between 0.4 and 1 with a center at 0.7). The second assigns higher membership values for SSH for image segments with lower values of the GLCM standard deviation in the vertical direction (in a range of 0-30, centered at 15), and the third is a curved ramp function that assigns higher membership values for SSH for image segments having higher values of the gamma ray log associated with the image segment (range=160-170, centered at 170). Those segments not meeting the SSH criteria are assigned to the not-SSH class 68. The SSH/not-SSH classification inherits not bedded, and not SSM OMBI images classification functions.

Within the not-SSH class 68, the next step separates MMF (muddy mass flow) 70 from not-MMF 72. For this separation, two functions are used, one relating to texture, and one using mean gamma ray log data. The first classification function is GLCM standard deviation (0°) with a curved ramp that assigns higher membership values for MMF membership for lower values of GLCM standard deviation in the vertical direction for the red component (0.1-0.6, centered at 0.35). The second is a curved ramp that assigns higher membership values for MMF for higher values of mean gamma ray log (130-150, centered at 140). Those segments not meeting the MMF criteria are assigned to the not-MMF class 72.

Finally, the not-MMF class 72 is separated into SMF (sandy mass flow) 74 and SLU (slurry) 76 classes. In addition to the inherited functions, these classes are identified based on GLCM standard deviation (0°) for the red vertical component of the image segment using a curved ramp extending along a range of 15-35, centered at 25. Image segments not meeting the SMF criteria, are assigned to the SLU class 76.

In the Example, this is the final step, and at this stage, each segment will be classified as one of seven facies or as background, and the geological profile is complete.

As will be appreciated, it may be useful to modify the classification functions depending on the actual data sets being classified. This may involve simply deactivating defined functions from a particular classification function set, or may involve replacement or use of additional functions.

Likewise, the steps may be performed in different orders, the ordering of the steps of the Example being merely exemplary, and not restrictive in nature. Re-ordering the classification steps may result in a need to make use of different functions, though this may not always be so. Given a particular hierarchy and inheritance of classification functions, for example, order of application is not relevant. As another particular example, there is no reason that the classification between MIX and MIB need be performed either before or after the classification between SSH and not-SSH, despite being described in that order above. As may be appreciated from FIG. 7, these two classifications are entirely independent of each other and may be performed in any order. However, where the hierarchy is changed, then the classification functions may likewise require changes in order to properly classify a data set.

Once a geological profile has been prepared, it may be used in a number of ways. For example, it may be used to understand a geological structure of a particular reservoir to improve prediction of flow of a resource such as petroleum or natural gas within the geological region. In this regard, geological boundaries, potential locations of exploitable subterranean resources, or the like may be identified. Models of the subsurface structures and predictions based thereon may then be used to determine prospective locations for further well development. Likewise, the geological profile determined in accordance with embodiments of the present invention may be used to confirm or refine a model that has been developed using seismic interrogation of the region.

Furthermore, such modeling and analysis can provide information regarding depositional environment for the subsurface geological structures. For example, one may be able to determine whether a subsurface feature pertains to structures deposited in a channel-like environment, or a wide, shallow basin. Such depositional information may be used as a basis for determining the potential of a particular reservoir for exploitation.

In an embodiment in accordance with the invention, the rules based classification may further incorporate a calibration/refinement sub-step. In this approach, the rules-based profile may be compared with actual cores, or checked against a human interpreter. If the comparison indicates that the rules-based classification needs refinement, then the classification functions may be adjusted in order to conform more closely to the chosen standard.

Similarly, the geological profile produced in accordance with embodiments of the present invention may be compared against previously known stratigraphic information. For example, for an area that has been previously mapped, for example by seismic interrogation, by nearby coring or other exploration techniques, or by modeling, analysis of the data may include comparing stratigraphic information developed from the geological profile with the previously known information. In general, this technique will find a greater use with regard to previously known information that is geographically near to a location of the subterranean formation being investigated. Similarly, where information is already known or modeled for a given geographical region, there may be a pre-selection of classification functions that are known or suspected to be well-suited to the nature of the particular region under study.

In the foregoing example, the rules primarily dealt with intensity and texture of the image segments, however other image parameters may be employed. For example, rules relating to shape, orientation or location of the segments, may be used as a basis for classification.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A method of analyzing characteristics of a subterranean formation comprising:
   transmitting a signal from within a borehole at least partially into a material of the subterranean formation such that the signal is transformed in a manner indicative of a characteristic of the material;
   receiving the transformed signal from the material;
   converting the transformed signal into image data indicative of the characteristic of the material;
   applying a first set of machine executable rules to the image data to produce segmented image data, wherein portions of the image that are sufficiently related according to the applied rules are grouped into segments; and
   analyzing, according to a second set of machine executable rules, the segmented image data to produce a geological profile comprising stratigraphic information of the subterranean formation.

2. A method as in claim 1, wherein the signal is an electrical signal, and the characteristic is a resistivity or an impedance of the subterranean formation.

3. A method as in claim 1, wherein the signal is a gamma ray signal, and the characteristic is a transmissivity or reflectivity of gamma radiation of the subterranean formation.

4. A method as in claim 3, wherein the applying further comprises relating the transmissivity or reflectivity to a density of a material comprising the subterranean formation.

5. A method as in claim 1, wherein the signal comprises a neutron beam, and the characteristic is a transmissivity or reflectivity of neutron radiation of the subterranean formation.

6. A method as in claim 5, wherein the applying further comprises relating the transmissivity or reflectivity to a density of a material comprising the subterranean formation.

7. A method as in claim 1, wherein the signal is a radio frequency electromagnetic signal, and the characteristic is a nuclear magneto-resonance of the subterranean formation.

8. A method as in claim 1, wherein the analyzing further comprises comparing the stratigraphic information with previously known stratigraphic information relating to formations geographically near to a location of the subterranean formation.

9. A method as in claim 1, wherein the analyzing further comprises comparing the stratigraphic information with modeled stratigraphic information relating to formations geographically near to a location of the subterranean formation.

10. A method as in claim 1, wherein the analyzing further comprises determining a location of a subterranean geological boundary.

11. A method as in claim 1, wherein the analyzing further comprises determining a location likely to contain exploitable subterranean resources.

12. A method as in claim 1, wherein the first set of rules further relate to one or more of color and location of picture elements of the image data.

13. A method as in claim 12, wherein the second set of rules relates to one or more of color, texture, shape, orientation and location of the segments.

14. A method as in claim 1, wherein the second set of rules relates to one or more of color, texture, shape, orientation and location of the segments.

15. A method as in claim 1, wherein:
the characteristic comprises a first characteristic;
the analyzing further comprises using information relating to a second characteristic of the material of the subterranean formation; and
wherein for two types of materials to be differentiated, the first characteristic is similar and the second characteristic is different.

16. A method as in claim 1, further comprising:
comparing the geological profile to a selected standard, and adjusting the second set of rules at least in part based on the comparison.

17. A method as in claim 1, wherein the second set of machine executable rules comprise a hierarchical set of rules for separating classes of geological materials.

18. A method as in claim 17, wherein the hierarchical set of rules are binary rules.

19. A method as in claim 17, wherein each rule of the hierarchical set of rules comprises at least one fuzzy classification function.

20. An apparatus for analyzing characteristics of a subterranean formation, comprising:
a probe, configured and arranged to transmit a signal from within a borehole at least partially into a material of the subterranean formation and to receive a transformed signal from the material, wherein the transformed signal is transformed in a manner indicative of a characteristic of the material;
a processor, configured and arranged to convert the transformed signal into image data indicative of the characteristic of the material and to apply a first set of machine executable rules to the image data to produce segmented image data, wherein portions of the image that are sufficiently related according to the applied rules are grouped into segments and to apply a second set of machine executable rules to analyze the segmented image data to produce a geological profile comprising stratigraphic information of the subterranean formation.

21. An apparatus as in claim 20, wherein the probe comprises a resistivity meter and the characteristic comprises a resistivity.

22. An apparatus as in claim 20, wherein the probe comprises a gamma ray source and detector, and the characteristic comprises a reflectivity or transmissivity of gamma radiation of the subterranean formation.

23. An apparatus as in claim 20, wherein the second set of machine executable rules comprise a hierarchical set of rules for separating classes of geological materials.

24. An apparatus as in claim 23, wherein the hierarchical set of rules are binary rules.

25. An apparatus as in claim 23, wherein each rule of the hierarchical set of rules comprises at least one fuzzy classification function.

26. An apparatus as in claim 20, further comprising a machine readable storage device, the machine readable storage device containing machine readable information relating to at least one of the group consisting of: previously known stratigraphic information relating to formations geographically near to a location of the subterranean location and modeled stratigraphic information relating to formations geographically near to a location of the subterranean location.

27. An apparatus for analyzing characteristics of a subterranean formation, comprising:
a bus, configured and arranged to receive, from a probe, data representing a characteristic of a material in a borehole; and
a processor, configured and arranged to receive the data from the bus, and to convert the data into image data indicative of the characteristic of the material and to apply a first set of machine executable rules to the image data to produce segmented image data, wherein portions of the image that are sufficiently related according to the applied rules are grouped into segments and to apply a second set of machine executable rules to analyze the segmented image data to produce a geological profile comprising stratigraphic information of the subterranean formation.

* * * * *